United States Patent [19]

Bajpai et al.

[11] Patent Number: 4,985,857

[45] Date of Patent: Jan. 15, 1991

[54] METHOD AND APPARATUS FOR DIAGNOSING MACHINES

[75] Inventors: Atul Bajpai, Warren; Richard W. Marczewski, Rochester; Melissa M. Marek, Royal Oak; Anil B. Shrivastava, Troy; Charles S. Amble, Prudenville, all of Mich.; Robert H. Joyce, San Jose, Calif.; Nanda Kishore, Los Gatos, Calif.; Steven J. Ollanik, Los Altos, Calif.

[73] Assignee: General Motors Corporation, Detroit, Mich.

[21] Appl. No.: 234,371

[22] Filed: Aug. 19, 1988

[51] Int. Cl.⁵ .............................................. G01F 15/15
[52] U.S. Cl. ................................ 364/551.01; 364/580; 364/513; 364/274.2; 364/274.3; 364/972.2; 364/200; 364/900
[58] Field of Search ............. 364/580, 508, 513, 551.01, 364/200, 300, 900; 371/15, 16, 17, 20

[56] References Cited

U.S. PATENT DOCUMENTS

| | | | |
|---|---|---|---|
| 4,517,468 | 5/1985 | Kemper et al. | 364/492 X |
| 4,628,435 | 12/1986 | Tashiro et al. | 364/130 |
| 4,644,479 | 2/1987 | Kemper et al. | 364/550 |
| 4,648,044 | 3/1987 | Hardy et al. | 364/513 |
| 4,649,515 | 3/1987 | Thompson et al. | 364/900 |
| 4,654,852 | 3/1987 | Bentley et al. | 371/29 |
| 4,658,370 | 4/1987 | Erman et al. | 364/513 |
| 4,698,756 | 10/1987 | Gonzalez et al. | 364/557 |
| 4,777,585 | 10/1988 | Kokawa et al. | 364/164 |

OTHER PUBLICATIONS

Hartzband et al., "Enhancing Knowledge Representation in Engineering Detabases," 9/85, pp. 39–48, IEEE Computer.

Michaelsen et al., "The Technology of Expert Systems," 4/85, BYTE, pp. 303–312.

Primary Examiner—Thomas G. Black
Attorney, Agent, or Firm—Albert F. Duke

[57] ABSTRACT

A general purpose expert system architecture for diagnosing faults in any one of a plurality of machines includes a machine information database containing information on characteristics of various components of the machines to be diagnosed and a sensory input database which contains vibration data taken at predetermined locations on each of the machines. The system knowledge base contains a plurality of general rules that are applicable to each of the plurality of machines. The generality of diagnosis is accomplished by focusing on components that make up the machine rather than individual machines as a whole. The system architecture also permits diagnosis of machines based on other parameters such as amperage, torques, displacement and its derivatives, forces, pressures and temperatures. The system includes an inference engine which links the rules in a backward chaining structure.

18 Claims, 19 Drawing Sheets

MACHINE TOOL VIBRATION MID (v1.0)

A - TOP LEVEL MACHINE CHARACTERISTICS
B - MAJOR COMPONENTS OF A MACHINE
C - SUBCOMPONENTS OF A MAJOR COMPONENT
D - MAJOR COMPONENT CONNECTIVITY IN A MACHINE
E - SUBCOMPONENT CONNECTIVITY
F - COMPONENT CHARACTERISTICS
G - MEASUREMENT POINTS FOR A MACHINE
H - SPATIAL REGIONS WITHIN A MACHINE
I - PREPROCESS AND COMPILE MACHINE DESCRIPTION
J - EXIT

TOP LEVEL MACHINE                              ADD

MACHINE NAME          : piston dbl
CAPITAL EQUIPMENT #   : 1234
STA/OP                :
UMTC                  : 21
LOCATION              : lanfl2c3
PLANT NAME            : lansing boc
MACHINE TYPE          : turning machine
DESCRIPTION MACHINE CHARACTERISTICS    VALUE          Characteristic Value machine_base_type                         casting
attachment_type                           weldment
                                          forging
                                          other

```
              MAJOR COMPONENTS                              ADD

MACHINE NAME         : piston dbl            Component Types
CAPITAL EQUIPMENT #: 1234                 belt_drive
STA/OP               :                    blower
                                          chain
MAJOR COMPONENT      : drive motor        clutch_brake
MODEL NAME           : dc delco           eddy_clutch
MODEL NUMBER         : 234-1              fan
COMPONENT TYPE       :                    gear_box
                                          generator
                                          mg_unit
                                          motor
                                          pump
                                          rotary_manifold
                                          rotor
                                          shaft_assembly
                                          spindle
```

*Fig. 4B*

```
                    SUBCOMPONENTS                              ADD

MACHINE NAME                                         Major Components
CAPITAL EQUIPMENT # : piston dbl            drive_motor
STA/OP              : 1234                  coupling_1
                    :                       coupling_2
MAJOR COMPONENT NAME: drive_motor           pump_1
MODEL NUMBER        :                       pump_2

SUBCOMPONENT NAME   SUBCOMPONENT TYPE front_bearing       bearing
rear_bearing        bearing
shaft               shaft
```

```
                MAJOR COMPONENT CONNECTIVITY                ADD

MACHINE NAME        : piston dbl
CAPITAL EQUIPMENT # : 1234
STA/OP              :

CONNECT FROM: shaft      of drive_motor

TO: drive_end   of coupling_1

TO:

List of Components and Subcomponents of this Machine
    END OF CONNECTIVITY GROUP
0   rear_bearing     of    drive_motor
1   front_bearing    of    drive_motor
2   shaft            of    drive_motor
3   drive_end        of    coupling_1
4   driven_end       of    coupling_1
```

Fig. 4E

```
              SUBCOMPONENT CONNECTIVITY              ADD

MACHINE NAME        : piston dbl
CAPITAL EQUIPMENT # : 1234
STA/OP              :

MAJOR COMPONENT: drive_motor

CONNECT FROM: rear_bearing

TO: shaft

TO:

List of Subcomponents of this Major Component
   0   END OF CONNECTIVITY GROUP
   1   rear_bearing
   2   front_bearing
   3   shaft
```

```
                COMPONENT CHARACTERISTICS           ADD

MACHINE NAME     : piston dbl          Valid Values
CAPITAL EQUIPMENT # : 1234         forging
STA/OP           :                 weldment
COMPONENT:   drive_motor Characteristics Defined for This Component CHARACTERISTIC                      VALUE
rotor_diameter                        9
rated_speed                         1170
type_of_base
```

```
                    MEASUREMENT POINTS                          ADD

MACHINE NAME      : piston dbl
CAPITAL EQUIPMENT #  : 1234
STA/OP            :

POINT NUMBER: 01

COMPONENT    : rear_bearing   of   drive_motor

List of subcomponents within this machine 0   rear_bearing     of        drive_motor
    1   front_bearing    of        drive_motor
    2   rear_bearing     of        pump_1
```

```
SPATIAL REGIONS                                    ADD

MACHINE NAME          : piston dbl
CAPITAL EQUIPMENT #   : 1234
STA/OP                :

REGION NUMBER    COMPONENT NAME        Major Component
    01           drive_motor         * drive_motor
                                       coupling_1
                                       coupling_2
    01           pump_1              * pump_1
                                       pump_2
```

Fig. 4H

METHOD AND APPARATUS FOR DIAGNOSING MACHINES

FIELD OF INVENTION

The present invention relates generally to computerized methods and apparatus for maintaining machines and more particularly to method of and a general purpose expert system for diagnosing machine problems.

BACKGROUND OF INVENTION

No machine, however well designed and constructed, can last indefinitely. Whenever there are moving parts, there will be wear and degradation of machine components leading to reduced performance quality and ultimate breakdown. The period between installation of a new machine and its final scrapping due to lack of availability of cost-effective repair or obsolescence may be termed the "useful life" of the machine. Prolonging the useful life of machines and keeping the machines operating smoothly in healthy condition during their useful life periods have been areas of special interest to maintenance personnel in the manufacturing industry. This invention addresses maintenance issues by utilizing a methodology by which diagnostics, and hence smooth operation, of machines can be better accomplished. Though a wealth of literature is available in the area of machine tool diagnostics, ranging from repair manuals provided by original equipment manufacturers to specialized books by experienced consultants, the generality of the knowledge engineering approach described herein is believed to be new.

Sensor based analysis has become an important part of the maintenance management program for detecting machine condition changes in many manufacturing facilities. With the help of such an analysis, one can monitor a machine's condition, identify problems before major breakdowns occur, predict up-time, and plan for maintenance or repair work when it is most convenient in an effort to minimize production downtime. However, several years of expertise is usually needed before a machine maintenance person can fully utilize the power of sensor based analysis. A method of capturing and organizing that expertise in a knowledge engineering framework is described herein which enables inexperienced, or even new mechanics to effectively and efficiently diagnose machine problems.

While the present invention was conceived for the purpose of diagnosing machines making automobile parts, it is equally applicable to machines in the aerospace industry, ship building industry and other manufacturing businesses engaged in the production of medium and heavy duty products.

SUMMARY OF THE INVENTION

In accordance with the present invention, an expert system is provided which comprises in addition to a commercially available inference engine, three unique modules. These modules are a Machine Information Database (MID), a Sensory Input Database (SID), and a Knowledge Base (KB).

The MID module contains information describing each of the major components of the machine, the relationship to one another, and the physical features of those components. For example, there may be descriptions about motors, pulleys, belt-drives, gear-trains, head-stocks, and jackshafts as some of major components that make up a machine. There are further descriptions of those components such as length of the belt, the diameter of the pulleys and the number of teeth on the gears. Additionally, the location of sensory data measurement points are specified in the MID as well the direction of measurement of the data.

The SID comprises sensory data collected at different points on the machine being diagnosed. Vibration data is used as an example of sensory data for the purposes of discussing the present invention. Vibration data contains frequencies and related vibration amplitudes associated with those measurement points. The data is collected by a mechanic using a portable hand-held accelerometer and recorder and is transferred to a computer where the data is converted to a flat file. The data in the flat file is subsequently converted to a form suitable for the knowledge engineering tool.

The KB constitutes the principal module of the system and it contains a rule base comprising the rules of vibration analysis as well as a fact base which contains dynamic information obtained from the MID and SID. This information is placed in the fact base each consultation with the expert system upon identification by the operator of the machine to be diagnosed. The fact base also contains the static facts describing default parametric values such as precision levels of various machine components. These default values will be used unless the operator provides parametric values of the components for the machine to be diagnosed. The KB is the heart of the expert system and may contain hundreds or thousands of rules that make up the expertise of the system. For example, one of the rules might be "If a component is suspected to be faulty, and the phase difference across that component is low, then do the following three things: (1) rule out the possibility of misalignment of that component; (2) postpone consideration of unbalance of components that are connected to this one; and (3) pursue the next most likely fault with the component being handled."

One of the primary features of the present invention is its general purpose architecture that permits it to handle different types of machines. For example, the system can diagnose problems on a state-of-the-art grinding machine. It can also diagnose problems with other sophisticated machines such as new lathes, milling machines, drilling machines and super-finishers. The invention is equally effective in diagnosing problems with old machines.

An expert system in accordance with the present invention is applicable to a very broad range of problems that occur in manufacturing and assembly equipment. Unbalance, misalignment, mechanical looseness, structural weakness, resonance of components, eccentricity, cavitation of pumps, problems due to bearing wear or bearing failure, and problems with gear trains are some examples of the types of problems that the system of the present invention can handle.

Some of the benefits of using the expert system of the present invention for diagnosing machine problems include (a) precise identification of problem components, (b) repairs prior to catastrophic failures (c) ability to schedule preventive maintenance at convenience (d) faster diagnostics process (e) distribution of the diagnostics expertise to multiple users and plants (f) improved part quality (g) longer uptimes for the machines (h) avoidance of "fixing" non-problems (i) reduced scrap (j)

longer useful life of capital equipment through better maintenance and (k) ability to run machines unattended.

The expert system of the present invention is applicable to many different machines and is therefore general purpose. The prior art expert systems are only applicable to individual machines. See for example the U.S. Pat. No. to Moore et al 4,697,243. In contrast the system of the present invention, can be used for virtually all types of machines with rotating components. It serves the purpose that would have typically required building several smaller expert systems. The generality is accomplished by focusing on the components that make up individual machines rather than by looking narrowly at specific machines. With the help of this system, it is possible to perform routine and diagnostic maintenance on a large variety of machines regardless of their age and/or function. New machines can be tested for rigorous compliance of performance standards so that repairs and replacements can be performed while those machines are still under warranty. Similarly, equipment manufacturers can employ the expert system of the present invention to test their products prior to shipment.

While the system of the present invention is particularly adapted to diagnose mechanical problems related primarily to the rotating components of machinery it is equally applicable to machines which use reciprocating components as long as the requisite knowledge is placed in the KB. Consequently, a vast majority of mechanical problems typically found in manufacturing and assembly plants can be diagnosed.

The system is also capable of locating and resolving problems with electrical systems, coolant and lubricant systems and hydraulic and pneumatic systems by incorporating sensory information in addition to or in place of the vibration data.

Moreover, by using permanently mounted, automatic sensors, on-line information may be linked to the SID and will permit maintenance monitoring of machines on a round-the-clock basis. Such a general purpose system may receive different types of sensory data from various strategic locations on the machine on a routine basis or on some alarms/thresholding basis. By adding further intelligence to the expert system, it can be made to control the polling of various sensors and the periodicity of the arrival of the sensory data.

Further, integration with existing factory controls, and networking with plant computers and maintenance management systems is readily accomplished with the system of the present invention.

Computer Aided Design (CAD) databases comprising machine descriptions may be linked to the MID of the present invention, thereby making machine description and design information available for direct downloading to the MID. This would permit maintenance of a centralized MID which may be shared by several plants located over distant geographical locations.

BRIEF DESCRIPTION OF THE DRAWINGS

A more complete understanding of the present invention may be had from the following detailed description which should be read in conjunction with the drawings in which:

FIGS. 4' and 4A-4H show video presentations of menu driven data input screens;

DESCRIPTION OF THE PREFERRED EMBODIMENT

Figure 1:
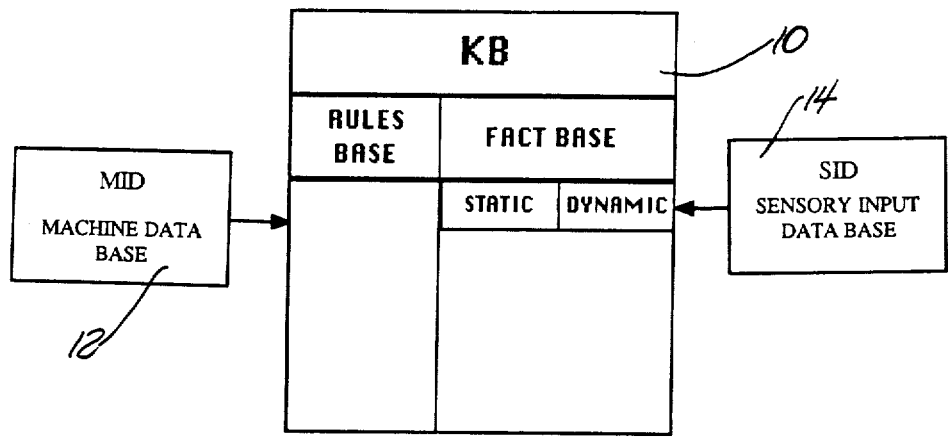
FIG. 1 shows the principal components of the expert system of the present invention.
Figure 2:
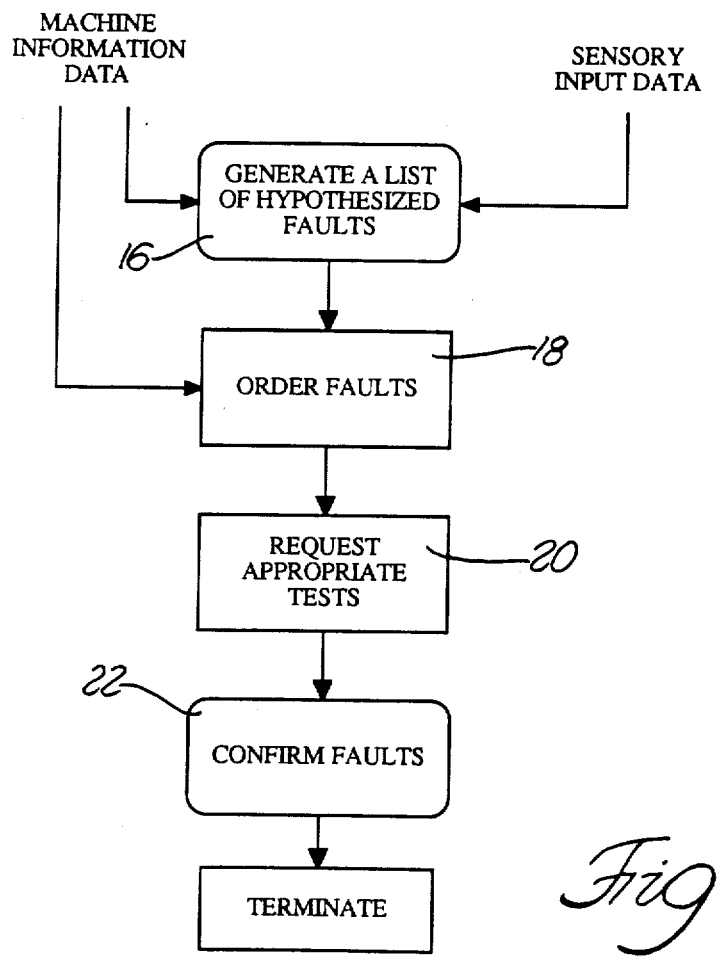
FIG. 2 shows the general diagnostic method of the present invention.

As shown in FIG. 1, the expert system architecture of the present invention comprises a Knowledge Base (KB) 10, a Machine Information Database (MID) 12 and a Sensory Input Database (SID) 14. Referring to FIG. 2, the MID and the SID provide input to the KB based on which the system generates a list of hypothesized faults as shown in block 16. The system then orders the faults on a prioritized basis as shown in block 18. As indicated in block 20, the system may request that the user perform certain tests in order to confirm one of the hypothesized faults. The confirmation occurs in block 22 and may be the identification of the most likely fault rather than an absolute conclusion. Based on the systems conclusions, the consultation is terminated.

Figure 3:
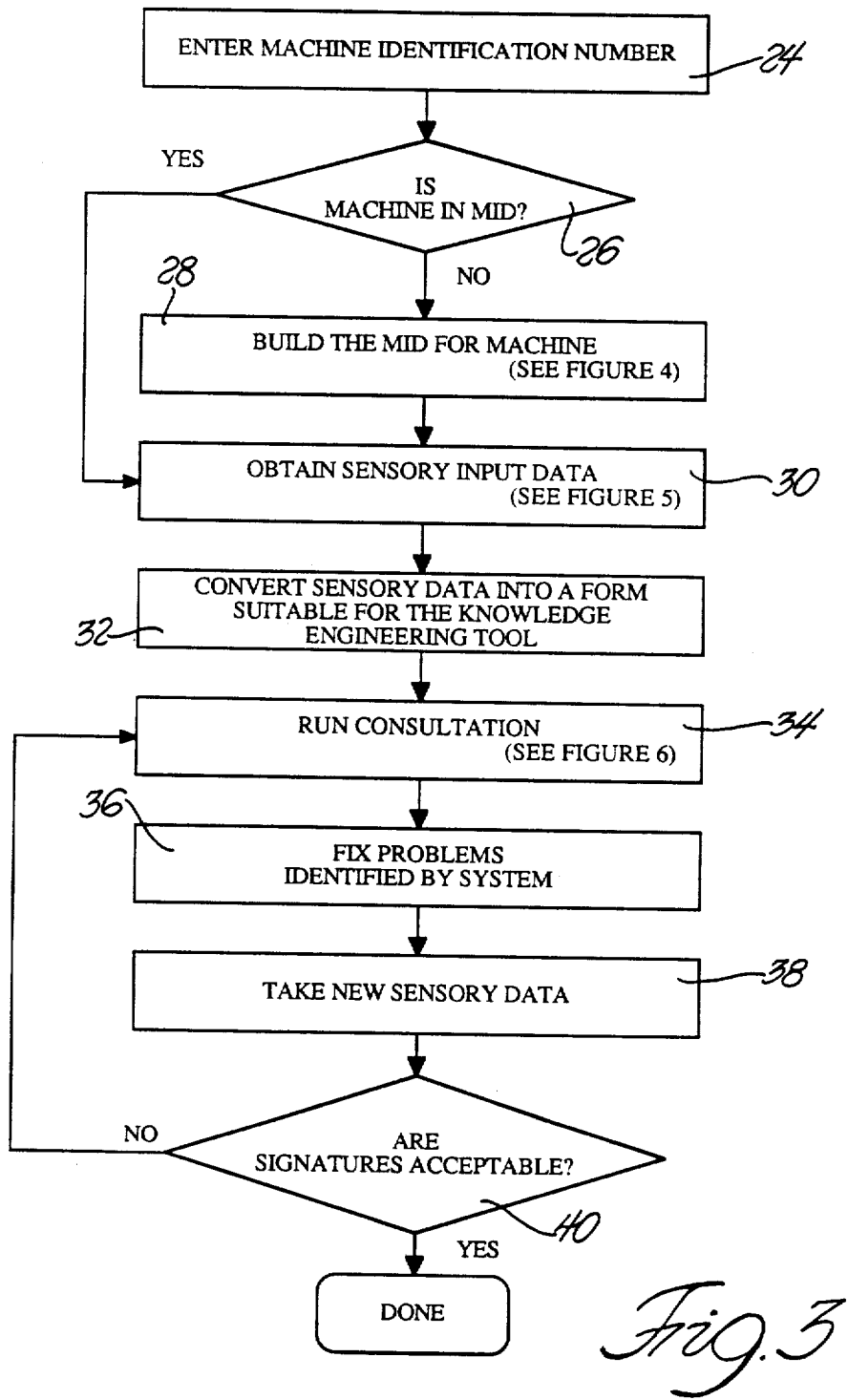
FIG. 3 shows the steps of interaction between the user and the system.

FIG. 3 shows the procedure users follow when applying the invention to a maintenance problem. As indicated in block 24, the operator first enters the identification number which uniquely identifies the machine to be diagnosed. As shown in block 26, if the MID does not already contain the machine's description the operator is requested to provide the machine's description to the MID, block 28. Next, as shown in block 30, sensory input data is obtained from strategic locations on the machines to be diagnosed and converted at block 32, into a form suitable for the knowledge engineering tool being used. The present invention has been implemented using an expert system building tool available from Teknowledge, Inc. However, any of several commercially available tools which features a backward chaining inference engine may be utilized. Once the MID and SID information is available, the system is ready to run a consultation as indicated in block 34. As show in block 36 the user fixes the problems identified by the system and after the necessary repair has been performed, new sensory data is taken, block 38. If the new sensory data does not reveal any problems the consultation is concluded, block 40, otherwise the consultation is repeated with the new sensory data, block 34.

Figure 4:
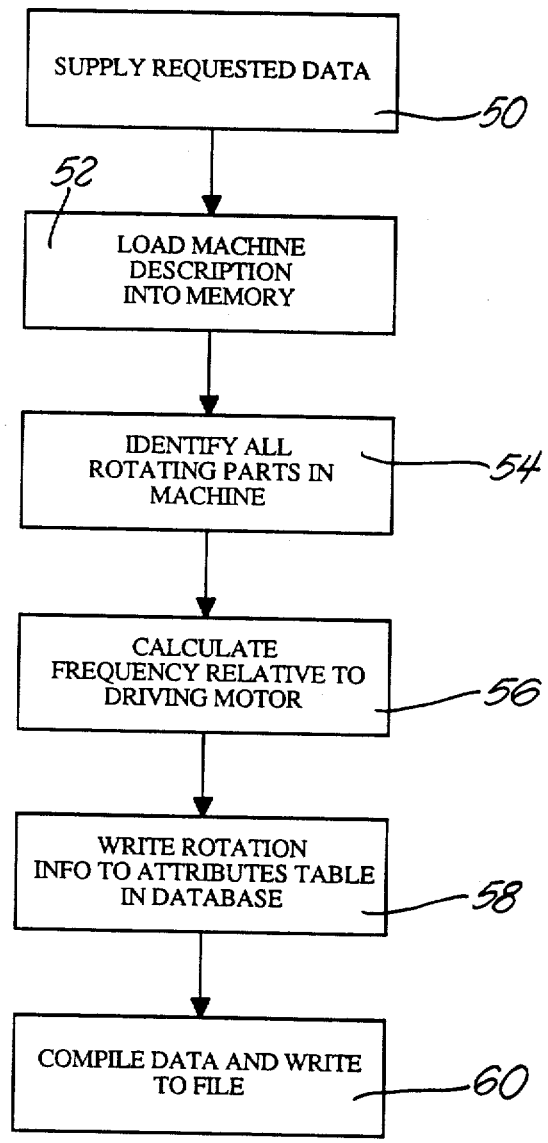
FIG. 4 shows the calculations performed during the preprocessing phase of the MID.

Referring now to FIG. 4, the MID data is input by the user, block 50. FIGS. 4' and 4A-4H show the various input screens that the system presents to the user in order to acquire the necessary information. As can be seen from a review of the tables the machine description includes the following information: the components and subcomponents that comprise the machine; the rotational speeds of the components; attributes that the KB might need during a consultation (e.g., rotor diameter of a motor); the performance levels of the various measurement points (this information helps set the thresholds); spatial regions of the machine, with the components and measurement points contained in the regions (this helps the KB focus its fault search); the connectivity of the components of the machine (the knowledge system uses this information to rank possible faults and select possible tests). After the MID data is input, the data is preprocessed. The purpose of preprocessing the data is to perform arithmetical calculations and to organize the machine data. The preprocessing steps include loading machine description and necessary formulas into memory, block 52. Next all the rotating parts are identified, block 54. As shown in block 56 the preprocessor recursively locates the motors and calculates the frequencies of rotating parts relative to the driving motor. The relative frequencies are calculated as the preprocessor, starting with the motor shaft, follows the connections through the machine. This information is stored in an attributes table, block 58. While the data is being processed, simple error checking is also done. The user, however, has the main responsibility for ensuring that the machine data is correct. Hash tables or pointers are used to speed up the data retrieval. Once the preprocessor has calculated and propagated the relative frequencies for all the rotating parts, it checks to determine if all subcomponents of a component have identical rotational frequencies. If so, the frequency is represented at the component level and all individual frequencies are deleted at the subcomponent level. The relative rotational frequencies are written back to the attribute table. The attribute table now includes all the machine information, including frequencies.

A data compiler is invoked to convert the attribute table to a form acceptable to the knowledge engineering tool. The compiler accesses the attribute table using a link list and writes the name, connections, regions, components, component characteristics, subcomponents with all their information, and measurement points for the machine, to a file, block 60.

Figure 5:
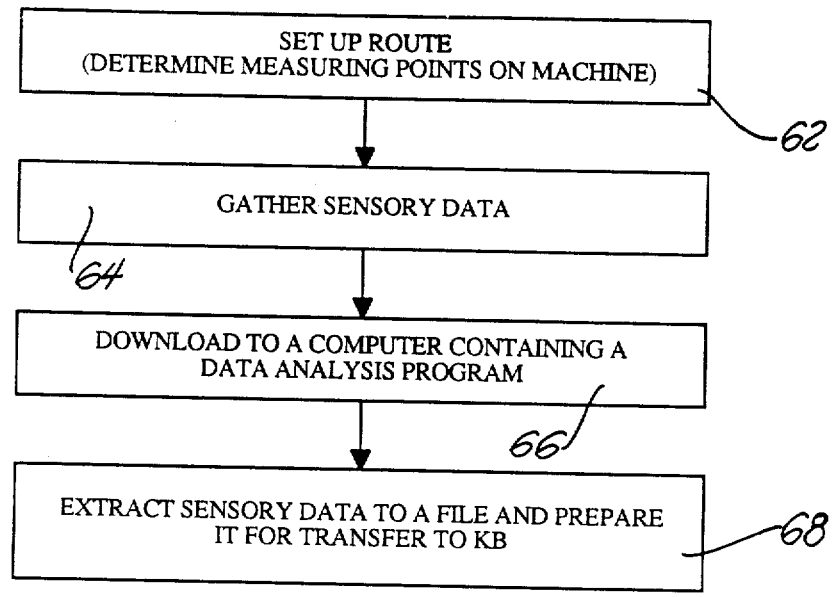
FIG. 5 shows the signature collection and conversion steps that take place in the SID.

Prior to beginning the consultation, the operator uses a commercially available vibration data gathering instrument to acquire readings at specified measuring points. As indicated in FIG. 5, these measurement points (collectively called a route) are determined when a machine is set up for a vibration maintenance schedule, block 62. The data gathered, block 64, includes among others the following: (a) Frequencies and associated amplitudes of vibration, (b) Direction in which reading was taken, (c) Measurement points.

This data is then downloaded, block 66, to a computer that contains a suitable, commercially available vibration analysis program which will if desired display various graphical representations of the data for visual inspection by the operator. The above identified data (a)–(c) is then extracted, block converted to a form suitable for use by the knowledge engineering tool and then transferred to the knowledge base.

Figure 6:
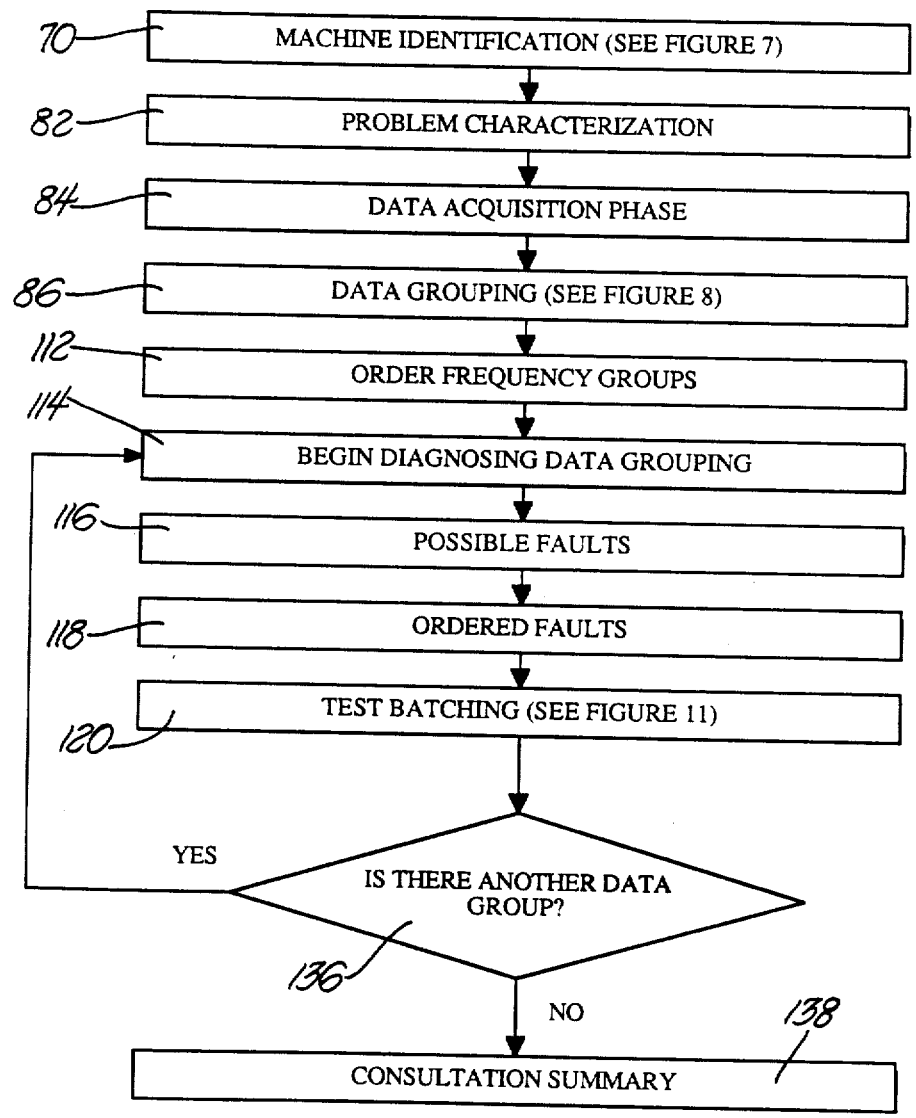
FIG. 6 shows the various steps that take place internally during a consultation between the user and the expert system.
Figure 7:
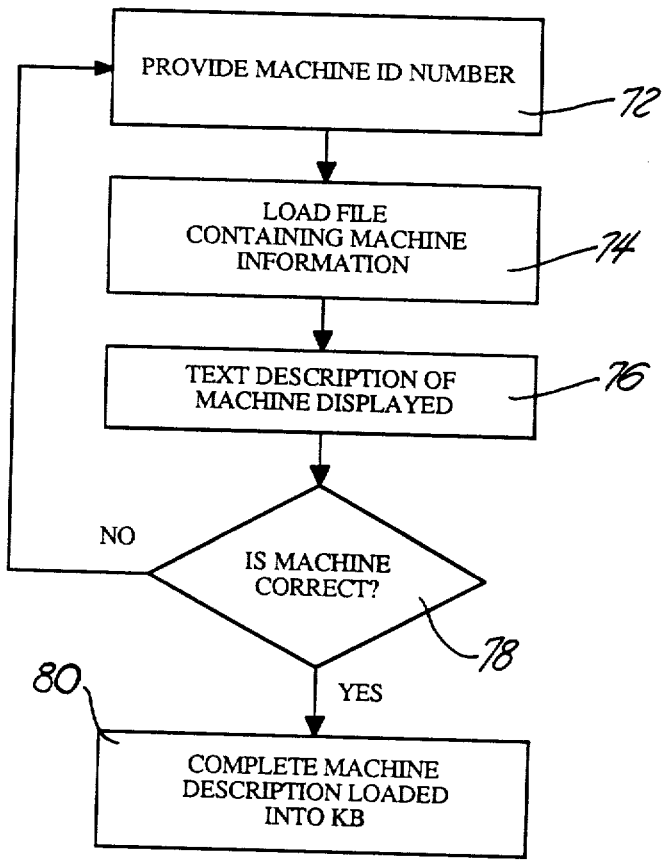
FIG. 7 shows the identification of the machine and retrieval by the KB of the appropriate data from the MID.

The various phases of a consultation with the expert system of this invention are shown in FIG. 6. There is a Machine Identification Phase designated 70, during which the mechanic is prompted for the machine ID number. As shown in FIG. 7, the ID number entered by the user, block 72, is used to locate a relevant file from the MID which is then stored in the knowledge base, block 74. This file contains a basic text description of the machine identified as well as the name of another file that contains the complete machine description. The text description is displayed to the user, block 76. The user is asked to confirm if this is the correct machine, block 78. If it is not, the user is asked for another machine ID number. If it is the correct machine, the complete machine description is loaded into the knowledge base, block 80.

Referring back to FIG. 6, a Problem Characterization phase designated 82, is entered in which the possible faults are prioritized based on the machine's history and any reported symptoms. This information is obtained through a number of question and answer sets, and is stored for future use.

During a Data Acquisition phase indicated at 84, signature data is acquired and then transferred to the knowledge base. Thereafter a Signature Grouping phase designated 86 is entered, in which the peaks and humps of the signature are determined and organized in order to effectively process the signature data. The analysis of the signatures is independent of the machine. Signatures are the primary evidence used in the diagnostic process performed by the expert system. Only the most recent signatures are pertinent. Historical signature readings are not relevant.

Figure 8:
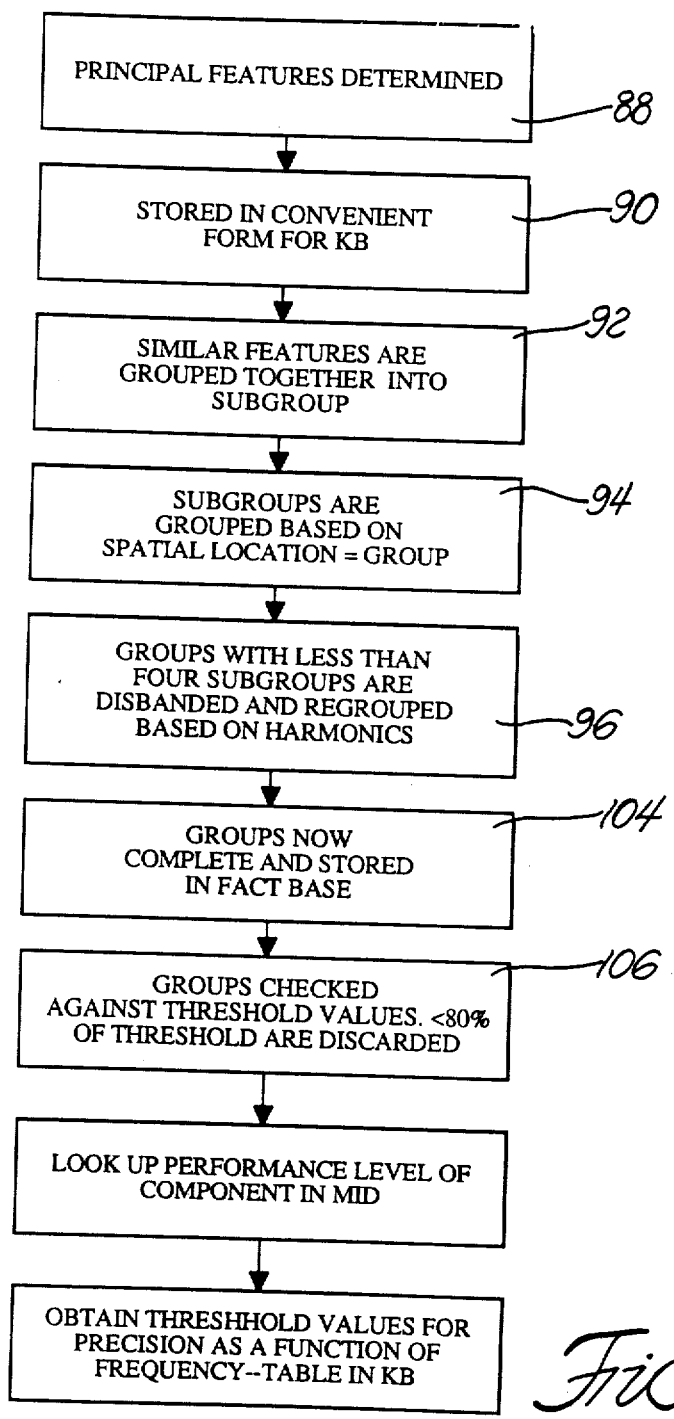
FIG. 8 shows the steps that are used to organize signatures into problem groups.

The Signature Grouping process is shown in greater detail in FIG. 8. The first step in signature grouping designated 88, is to determine the peaks and humps. These peaks may or may not represent a problem. Peaks must pass the following criteria: (a) the amplitude of the peak is greater than the amplitude of the smoothed average curve of the signature (a weighted average of the amplitude around each data point) multiplied by a predetermined factor, set by the expert, of for example 1.2; (b) peak amplitude is greater than the noise level. The noise level is one of two preset values such as 0.004 inches/sec. or 0.006 inches/sec.. If 70% of the amplitudes are below the lower preset value, then the lower preset value is used. Humps must pass the following criteria: (a) all portions of a hump must lie above a predetermined minimum frequency, (b) all humps must be predetermined minimum frequency width, (c) original spectrum must lie at or above the noise level for the entire width of the hump, (d) a smoothed hump must lie at least a predetermined percentage above the noise level.

Once the signature is broken down into peaks and humps, it is organized in a format acceptable to the knowledge engineering tool, block 90. There are four major pieces of data for each signature: the signature location, lines of resolution, direction, and maximum frequency. Then for each peak, the amplitude and center frequency are stored. For each hump the maximum amplitude, average amplitude, starting frequency, and ending frequency are stored.

As shown in block 92, subgroups of peaks and humps having the same frequency and direction are formed. Thereafter, as indicated in block 94, subgroups with the same spatial location on the machine are merged together. The spatial location is obtained from the MID. Merged subgroups containing less than four (4) subgroups are too small to potentially confirm an area of a machine to be a problem. Therefore such merged subgroups are disbanded and regrouped based on harmonics, as shown in block 96. Harmonics are used to identify frequencies that are echoes from parts in other areas of the machine. This is to assist in pinpointing the areas of the machine that are problems.

This grouping of the subgroups is accomplished as follows: (a) First the subgroups are arranged in ascending order of frequencies. (b) Next the ratio of the frequency of each subgroup to the frequency of the lowest frequency subgroup is computed. If the ratio is an integer less than a predetermined constant, such as for example, 6, then the subgroups are merged into a first group. (c) If the ratio is 6 or more, then a new ratio is computed, this time using the highest frequency considered so far in place of the frequency of the lowest frequency subgroup. If the new ratio is less than 6 then the subgroups are merged into the first group. (d) If a non-integer is obtained while computing either of the above ratios then the highest common factor of the two frequencies under consideration is determined and the frequencies under consideration are divided by this highest common factor. If the division yields integers of less than 6 then the two subgroups represented by the frequencies under consideration are merged into a second group. The aforegoing regrouping process is repeated for any remaining subgroups until no more subgroups remain. If this does not exhaust the subgroups then each of those remaining subgroups are thereafter considered groups. In the end, all the subgroups are placed in groups, block 104. The information in the fact base now includes; the groups; largest amplitude for each group; and for each group the direction, nominal frequency, types(peaks/humps).

Figure 9A:
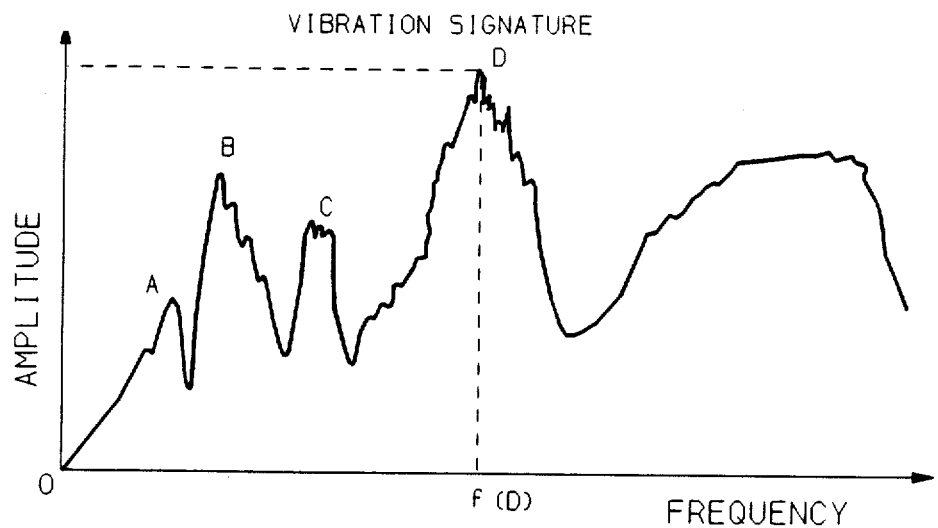
FIGS. 9a and 9b shows a graphical representation of the threshold identification process.
Figure 9B:
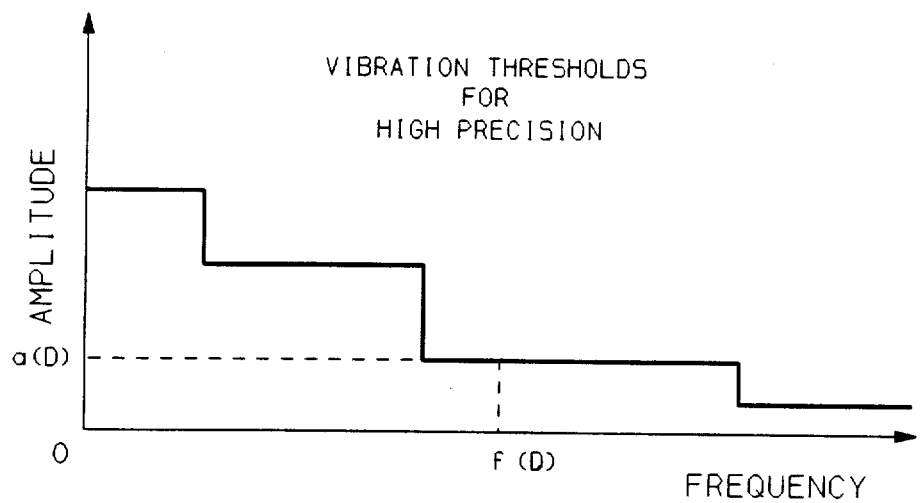

As indicated in block 106 the amplitude of the signatures in the groups are compared against predetermined threshold values. The threshold values may be different from pattern to pattern. There are two parameters used in determining threshold values: the frequency of the signature pattern; and the performance level of the component on which the signature pattern appeared. The MID contains the performance level associated with the components. As shown in block 108, the performance is obtained from the MID, having been previously entered or provided by the user. If it is unknown, the performance level is automatically set to a default value of, for example, an average performance level. The other levels possible are very high, high, low, and rough performance. The knowledge base has a table for each performance level and each table contains a plurality of frequency values and corresponding acceptable threshold amplitudes. These threshold values are set by the human expert. The threshold value is then looked-up based on a signature pattern's frequency and performance level as indicated in block 110. For example, as shown in FIG. 9a, for each peak, identified as A-D, the frequency at which the peak occurs is obtained from the signature data. For example, peak D occurs at frequency f(D). Assuming that the performance of the component on which the reading at D was obtained is a high precision component, then the corresponding threshold value a(D) is obtained from the high precision table as represented by FIG. 9b.

If the amplitude at D is above the threshold a(D), a problem very likely exists. If any amplitude in a group is above threshold, the group is set aside as a problem group. The system then looks at other groups in the same spatial region, and checks them for amplitudes that are 80% of threshold. If one exists, then it is also marked a problem group. These are marked to contain potential problems. At this time, the type of problem is unknown. It could be any that the system can diagnose or one that it cannot. If the amplitude value is between 80% and 100% of threshold a potential problem exists. Only those groups that represent existing or potential problems are considered for further analysis.

Only one frequency group will be analyzed at a time. As shown in FIG. 6, block 112, the system recommends a preferred order of analyzing the frequency groups based on user supplied symptoms and associated components of the machine which exhibit the symptoms, and on the severity of possible problem as determined by the amount by which the amplitude exceeds the threshold. In other words, it is preferable to first consider those frequency groups which include components that the user identifies as exhibiting a problem, or in the absence of user input, groups that have high amplitude values.

After the ordered frequency groups have been determined, the expert system begins diagnosing the first frequency group, as indicated at block 114. In the block identified at 116, possible fault areas are identified based on signatures in this first group and rules associated with signatures and machine components as obtained from the MID. After the fault areas are identified, they are prioritized by the expert system as indicated at 118. This prioritization is determined, based on data provided by the user during the Problem Characteristic phase 82 and the components if any, which are identified as potential problem components by the user.

Figure 10:
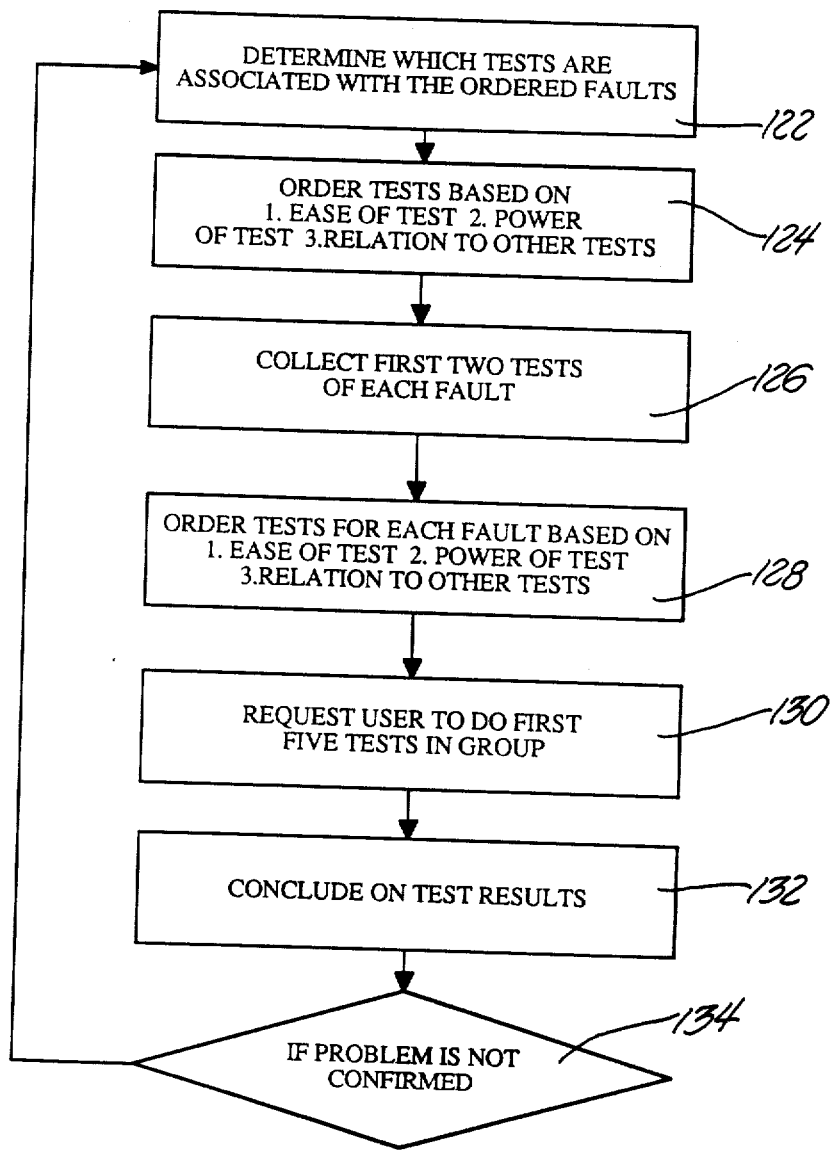
FIG. 10 shows the steps involved in determining and ordering appropriate tests for machine fault confirmation.

During the Test Batching phase indicated at block 120, the expert system determines which tests, if any, are needed to confirm the ordered faults as shown in FIG. 10, block 122. The tests are requested by the expert system in batches in order to allow the user to work more efficiently. Test batching has two benefits for the user: it reduces the number of trips to the machine to gather data; and it provides a set of tests to perform, which the technicians can schedule in a manner that minimizes the time spent dismantling the machine. The selection of tests to be performed are based on: potential fault conclusion that the test can reach, and the preconditions which must be met to perform the test. The criteria used by the expert system in determining the sequence of the tests that should be performed for each fault, block 124, is based on: (a) ease of doing a test for a normally skilled operator; (b) the likelihood that the test will help identify the fault that has the highest certainty factor (CF); (c) relation to other tests (i.e., it is best to perform a belt loosening test prior to a belt disconnect test).

Once the sequence of the tests is identified for each fault, the first two tests in the sequence for each of the faults are grouped, block 126 and ordered, block 128, based on the above mentioned criteria. The user is then requested to perform the first 5 tests in the ordered group of tests, block 130. The system will query the user on the results of the tests performed. The rules are applied to the input provided by the user and additions and adjustments to the faults and their rankings are made as indicated in block 132. For example, based on the test results the system may revise belief in a fault (increasing or decreasing); rule out a fault; defer consideration of a fault until everything else is ruled out or; confirm a fault. As indicated in block 134, if no one fault is confirmed, the test batching procedure is performed again, beginning at block 122, except that the tests already performed for that frequency group are discarded. Referring back to FIG. 6, as shown in block 136, once a fault is confirmed for the problem frequency group, the next problem group is analyzed beginning at block 114. If no more frequency groups remain, then a summary of all faults and necessary repair recommendation are provided, block 138 and the consultation is terminated. The summary also identifies any tests that corrected problems. On some occasions when the system is unable to confirm a fault with 100% certainty it may suggest repairs for faults having significantly high certainty or for faults for which the time to perform the repair is less than the time to do further diagnostic tests. If there is no identified problem, this is stated. Finally, information on emerging bearing problems is reported.

During a frequency group diagnosis, the system may decide that a certain repair action should be attempted, even if the associated fault is not confirmed. In this way it acts like the human expert who would attempt repairs even if not 100% sure.

Once the necessary repairs are made, then a new signature set is taken and entered in the SID. When attempting to verify that the repairs have indeed corrected the problems, the system resets most of the facts in the fact base (except for machine data, history data, and repair actions taken). The new requested signature data is processed. Any new symptom information is also processed. If no signature patterns exceed threshold, and no problem symptoms are seen then the system confirms that all problems have been fixed correctly. Otherwise, it repeats the diagnostic cycle.

Figure 11:
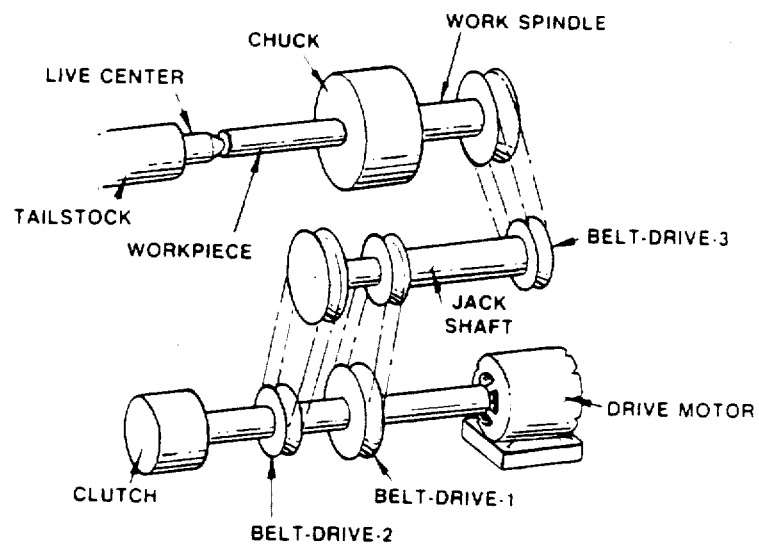
FIG. 11 shows a schematic of a lathe drive train which is useful in understanding an application the present invention.

An example of the application of the present invention to a simple machine, such as a lathe drive train, will now be described with reference to FIG. 11. Let the machine be comprised of the following components shown in FIG. 11:

Drive Motor, Belt-Drive-1, Belt-Drive-2, Clutch, Jackshaft, Belt-Drive-3, Work Spindle, Chuck, Live Center, Tailstock.

Assuming that based on user input during the Problem Characterization phase and based on information from the SID the system generates the following list of hypothesized faults; misalignment of belt drive 3, unbalance of motor and looseness of belt drive 3, the system searches for rules which would help it confirm each one of these faults. Assume that the rule base contains the following rule.

If: There is a high level of vibration on a component
  and that component is not cantilevered or resonating
  and vibration frequency matches low integral multiples of the rotational frequency of that component.
Then: Conclude that the component under investigation is misaligned
  and rule out the possibility of looseness of that component.

Each of the conditions in the premise part of the rule is tested. Assume that based on SID information the amplitude of vibration on belt drive 3 is above threshold and given that belt drive 3 is not cantilevered or resonating, the system checks to determine if the vibration frequency is a low integral multiple (for example 2) of the speed of rotation of belt drive 3. If this is so, then the system makes two decisions: first, if confirms that the belt drive 3 is misaligned; and second, it removes the possibility of looseness of belt drive 3 from it's list of hypothesized faults. If the rule had failed, i.e. one of the conditions in the premise was not satisfied, then no conclusion would have been made and other rules would be tried in an attempt to confirm the hypothesized faults.

A typical consultation is attached as Appendix A. A review of this consultation may be helpful in further understanding the details of the system's functioning.

APPENDIX A

----------Machine Identification Phase----------

Please enter the Capital Equipment Number of the machine.
>> 88888
The Capital Equipment Number that you entered has identified the machine as water_impeller_pump_test_unit located in Lansing plant.

Is this correct? Please answer either:
  1. yes
  2. no
>> 1

----------Problem Characterization Phase----------

What are the symptoms of the problem? Possible choices:
1. no_observable_symptoms
2. excessive_vibration
3. objectionable_noise
4. abnormal_signature
5. repeated_subcomponent_failure
6. part_quality_problem

>> 1

Please indicate if possible, which of the following have occurred recently on this machine.

1. none_of_these
2. machine_moved
3. components_replaced
4. components_removed_and_reconnected
5. changed_machine_configuration
6. changed_operating_speed
7. machine_remained_idle_for_some_time
8. observed_abnormal_signature_trend

>> 1

_____Signature Acquisition Phase_____

You should now extract the signature readings for machine 88888.
The signature should be of the form:
    88888.sig Are you ready to continue?

1. yes
2. no
>> 1 identifying peaks and patterns....done

Organizing signature data into groups...

*******************Frequency Group 1*******************
This group contains amplitude readings exceeding a component's threshold amplitude. The threshold amplitude is the amplitude in which any reading found above it, is considered a problem.

| Amplitude | Frequency | Direction | Position | |
|---|---|---|---|---|
| 0.287 | 1800.0 | horizontal | drive_motor | : rear_bearing |
| 0.192 | 1800.0 | axial | drive_motor | : rear_bearing |
| 0.076 | 1800.0 | vertical | drive_motor | : rear_bearing |
| 0.066 | 7200.0 | horizontal | impeller_pump | : rear_bearing |
| 0.036 | 7200.0 | vertical | impeller_pump | : front_bearing |
| 0.027 | 450.0 | horizontal | impeller_pump | : rear_bearing |
| 0.015 | 35700.0 | horizontal | impeller_pump | : front_bearing |

Preliminary analysis of readings within the group indicates problems most likely on the following
components or those nearby.
- drive_motor
- drive_coupling Signature data suggests that this is the only
frequency group on this machine that is a problem.

Would you like the diagnosis to proceed?
Please answer either:
1. yes
2. no
>> 1
-----------Beginning Diagnosis of Frequency Group 1--------------------

---------Components in Spatial Region of Frequency Group------------------ drive_motor
    drive_coupling
    impeller_pump

The rated speed of the drive_motor is 1800 rpm.
Please enter the actual operating speed of the drive_motor
in RPM.
>> 1800

---------Related Frequency Components-------------------- drive_motor
    drive_coupling
    impeller_pump

Looking first for most likely faults.....

Ruling out cavitation of impeller_pump
Ruling out unbalance of drive_coupling
Ruling out loose_bore_to_shaft_fit of drive_coupling
Ruling out misalignment of impeller_pump
Ruling out unbalance of impeller_pump Looking for generally applicable tests executed before....

-------------Fault Hypothese of Frequency Group 1----------------------

| | |
|---|---|
| unbalance of drive_motor | < 61> |
| misalignment of drive_coupling | < 47> |
| weakness of mount of drive_motor | < 32> |
| resonance | < 32> |
| bent_shaft of drive_motor | < 30> |
| misalignment of drive_motor | < 28> |
| excessive_bearing_end_play of drive_motor | < 21> |

Generating Test Batch....

Ordering Test Batch....

Identifying measurements to gather....

------------- Tests for Batch Number 1----------------------------------

Weak mount inspection test:

The evidence suggests that the mount of drive_motor
may be structurally weak or rigidly connected to a base
with a heavy mass thereby dampening the signal.
Please take filtered measurements at 1800.0 cpm at
various points on the mount of drive_motor in the
direction of largest amplitude.
Look for the following conditions:
    1. one end of mount has high reading while other end has low reading
    2. reading similar but amplitude is low
    3. reading similar but amplitude is high
    4. no apparent relationship between the readings Hammer test:

With the machine turned off, attach the probe to the
drive_motor in the direction of maximum amplitude.
Tap on or near the drive_motor with a hammer and note
ALL resonant frequencies using a real time analyzer.

End play test:

Check the end play between the bearings on the
drive_motor.

Phase across bearing test:

Take phase measurements across the drive_coupling
in the axial direction at or near 0 degrees (12 o'clock)
positions making sure that measurement points are directly
across from each other. Note the phase angle at each point.
CAUTION: If the probe is pointing in one direction while
taking measurements at one point and pointing in the
opposit6e direction while taking measurements at the other
point, then a 180 degree correction factor must be applied.
----------------End of Tests Requests for Batch------------------------

-------------Test Data Gathering phase for Batch 1---------------------

After performing the weak mount inspection test,
which of the following conditions were observed on
taking filtered measurements at 1650.0-1950.0 cpm at various
points on the mount of drive_motor?

1. one_end_of_mount_has_high_reading_while_other_end_has_low_reading
    2. readings_similar_but_amplitude_is_low
    3. readings_similar_but_amplitude_is_high
    4. no-apparent_relationship_between_the_readings
    5. unable_to_perform_test
>> why If the results show that one end of the mount is high
and the other is low, then there is a weak mount.

After performing the weak mount inspection test,
which of the following conditions were observed on
taking filtered measurements at 1650.0-1950.0 cpm at various
points on the mount of drive_motor?

1. one_end_of_mount_has_high_reading_while_other_end_has_low_reading
    2. readings_similar_but_amplitude_is_low
    3. readings_similar_but_amplitude_is_high
    4. no-apparent_relationship_between_the_readings
    5. unable_to_perform_test
>> explain
Enter one of:
    1. Faults being considered
    2. Faults rejected or deferred
    3. Tests already executed
    4. Why question is being asked
    5. How to perform tests
    6. Exit
>> 1
Enter one or more of:

1. all_faults_below
    2. excessive_bearing_end_play of drive_motor
    3. weakness of mount of drive_motor
    4. resonance
    5. unbalance of drive_motor
    6. bent_shaft of drive_motor
    7. misalignment of drive_motor
    8. misalignment of drive_coupling
>> 1
    FAULT HYPOTHESES FOR FREQUENCY GROUP 1 unbalance of drive_motor

Initially suspected because:

pfault_3(motor,1,unbalance):

If one of the componentds is a motor
and one of the observed peaks is at 1
times the speed of the motor then a
possible fault is unbalance of that motor
Factors that altered belief:

ofault_6(unbalance,motor):

Revise belief in the unbalance on a motor
based on apriori likelihood.

ofault_47(1,unbalance,increase,large_amount):

If the predominant frequency of the peaks is at 1 times the rotational speed of a component
then increase belief in unbalance of that
component by a large_amount.

misalignment of drive_coupling

Initially suspected because:

pfault_3(coupling,1,misalignment):

If one of the components is a coupling
and one of the observed peaks is at a 1
times the speed of the coupling then
a possible fault is misalignment of that
coupling Factors that altered belief:

ofault_6(misalignment,coupling):

Revise belief in the misalignment on a coupling
based on apriori likelihood.

ofault_47(1,misalignment,increase,small_amount):

If the predominant frequency of the peaks is at
1 times the ro9tational speed of a component
then increase belief in misalignment of that
component bhy a small_amount.

weakness of mount of drive_motor

Initially suspected because:

pfault_151:

If the largest reading ils observed on a motor
with an unusual mount at 1X or 2X rotational
frequency, then a possible fault is structural
weakness of the motor mount Factors that altered belief:

ofault_7(weakness,motor):

Revise belief in the weakness on a motor
based on apriori likelihood.

resonance

Initially suspected because:

pfault_8

Structural resonance is always a possible fault.

Factors that altered belief:

ofault_7_1:

Revise belief in structural resonance based on apriori likelihood.

bent-shaft of drive_motor

Initially suspected because:

pfault_3(motor,1,bent-shaft):

If one of the components is a motor
and one of the observed peaks is at 1
times the speed of the motor then
a possible fault is bent-shaft of that
motor Factors that altered belief:

ofault_6(bent-shaft,motor):

Revise belief in the bent-shaft on a motor
based on apriori likelihood.

ofault_47(1,bent-shaft,increase,small_amount):

If the predominant frequency of the peaks is at
1 tiames the rotational speed of a component
then increase belief in bent-shaft of that
component by a small_amount.

misalignment of drive_motor

Initially suspected because:

pfault_3(motor,1,misalignment):

If one of the components is a motor
and one of the observed peaks is at 1
times the speed of the motor then
a possible fault is misalignment of that
motor Factors that altered belief:

ofault_6(misalignment,motor):

Revise belief in the misalignment on a motor
based on apriori likelihood.

ofault_47(1,misalignment,increase,small_amount):

If the predominant frequency of the peaks is at
1 tiames the rotational speed of a component
then increase belief in bent-shaft of that
component by a small_amount.

excessive_bearing_end_play of drive_motor

Initially suspected because:

pfault_32:

If one of the components is a motor which shows
excessive motion in the axial direction then a
possible porblem is excessive bearing end play
within that motor.

Factors that altered belief:

ofault_6(excessive_bearing_end_play,motor):

Revise belief in the excessive_bearing_end_play on a motor
based on apriori likelihood.

After performing the weak mount inspection test,
which of the following conditions were observed on
taking filtered measurements at 1650.0-1950.0 cpm at various
points on the mount of drive_motor?

1. one_end_of_mount_has_high_reading_while_other_end_has_low_reading
    2. readings_similar_but_amplitude_is_low
    3. readings_similar_but_amplitude_is_high
    4. no-apparent_relationship_between_the_readings
    5. unable_to_perform_test
>> 2

After performing the hammer test,
please enter ALL resonant frequencies
observed in the area of drive_motor.
Separate the values by commas. E.g. 2000,6000,15000
If the resonant frequencies are not known, please
enter unknown.

>> 1800

After performing the end play test,
which of the following conditions were observed
on checking the end play on the drive_motor?

1. significant_end_play_observed
    2. no_significant_end_play_observed
    3. spring_loaded_returns_to_original_position
>> 2

After performing the phase across bearing test,
answer the following questions:
Please enter the phase measurement in degrees
from the 0 degrees (12 o-clock) position, for one
of the bearings on the drive_coupling?

>> 0

Please enter the phase measurement in degrees
from the 0 degrees (12 o-clock) position, for the
other bearing on the drive_coupling?

>> 145

-----------------End of Test Data Gathering Phase---------------------

Forming Test Conclusions.....

---------------------------------------------------------------------
Compared the radial direction amplitude with the
axial direction amplitude on the drive_motor.

RESULT: high_axial
---------------------------------------------------------------------

Decreasing belief in unbalance of drive_motor
by a large_amount

Increasing belief in weakness of mount of drive_motor
by a fair_amount

Increasing belief in bent-shaft of drive_motor
by a fair_amount

Increasing belief in misalignment of drive_motor
by a fair_amount

- Increasing belief in misalignment of drive_coupling
by a fair_amount

---------------------------------------------------------------------
Inspected the mount of drive_motor for possible weakness
by taking measurements at various points on the mount.

RESULT: readings_similar_but_amplitude_is_low
---------------------------------------------------------------------

Deferring consideration of weakness of mount of drive_motor

---------------------------------------------------------------------
Tapped around with a hammer and checked for possible
resonance with a real time analyzer.

RESULT: reading_related_to_resonant_frequency
-------------------------------------------------------------------

Marking resonance to be repaired.

-------------------------------------------------------------------
Checked for possible end play between the bearings
on the drive_motor RESULT: no_significant_end_play_observed
-------------------------------------------------------------------

Ruling out excessive_bearing_end_play of drive_motor

-------------------------------------------------------------------
Observed phase readings across the drive_coupling.

RESULT: phase_difference_significant
-------------------------------------------------------------------

Increasing belief in misalignment of drive_coupling
by a large_amount
Decreasing belief in bent-shaft of drive_motor
by a small_amount -------------------------------------------------------------------
Terminating further analysis of Frequency Group 1 since immediate3
repairs are necessary for the following problem(s)

- misalignment of drive_coupling

-------------------------------------------------------------------

-----------------Summarization Phase-------------------------------

CONSULTATION SUMMARY:
--------------------

-------------------------------------------------------------------
Frequency Group 1
-----------------

Suggested Repair Actions
------------------------

This problem MUST be CORRECTED before anymore diagnosis
on this group can be made:

- Check and realign the drive_coupling.

In addition, the drive_motor appears to be
structurally weak. It is advisable to reinforce
the structure.

Problem(s) listed here were marked for repair
during the consultation:

- Eliminate the resonance conditio9n by one of the following ways:
  1. Stiffening the structure.
  2. Addinhg additional mass to the structure.

In addition, the drive_motor appears to be
structurally weak. It is advisable to reinforce4
the structure.

A likely explanation of the observed data in
Frequency Group 1 appears to be due to:

- misalignment of drive_coupling

Suggested Repair Action:
------------------------

- Check and realign the drive_coupling.

Please check and correct (if found) these
other possible problem(s):
------------------------------

- unbalance of drive_motor
- misalignment of drive_motor
- bent-shaft of drive_motor The embodiments of the invention in which an exclusive property or privilege is claimed are defined as follows:

1. A general purpose expert system architecture for diagnosing component faults in any one of a plurality of machines, comprising a machine information database containing information on physical characteristics of various components of at least one of said plurality of machines, a sensory input database containing sensory data taken at predetermined locations on at least one of said plurality of machines, a knowledge base containing a plurality of general rules that are applicable to all components of interest in the plurality of machines without reference to any specific machine, and an inference engine which manipulates the rules to enable the system to identify faults based on data from said sensory database and information from said machine information database.

2. A general purpose diagnostic expert system architecture for diagnosing faults in any one of a plurality of machines, comprising a machine information database (MID) containing physical characteristics of various components of each of said plurality of machines, a sensory input database (SID) containing sensory data taken at predetermined locations on each one of said plurality of machines, and a knowledge base (KB) containing a plurality of general rules that are applicable to all of said plurality of machines and which are based on machine component performance, said system further including an inference engine which manipulates the rules, said system responding to operator identification of a specific machine to act on information obtained from the MID and the SID that relates to said specific machine in order to render a fault diagnosis.

3. The invention defined in claim 2 wherein said KB comprises a rule-base consisting of said rules, and a fact-base which contains dynamic and static facts, said dymanic facts corresponding to the information obtained from said MID and SID and said stactic facts includes at least one lookup table containing entries corresponding to predetermined constraints that must be satisfied with respect to all components of a predetermined precision level.

4. The invention defined in claim 2 wherein said KB comprises a rule-base consisting of said rules, and a fact-base which contains dynamic and static facts, said dynamic facts corresponding to the information obtained from said MID and SID and said stactic facts are included in a plurality of lookup tables containing threshold values of amplitudes for a predetermined range of frequencies which are maximum acceptable amplitude values common to all components, each lookup table corresponding to a predefined precision level.

5. An automated method of diagnosing potential and existing faults on a plurality of machine each of which have a plurality of components, using an expert system having a knowledge engineering tool, and a knowledge base containing a plurality of general rules that are applicable to all components of interest in the plurality of machines without reference to any specific machine, said knowledge base having a fact base, and a rule base containing a plurality of rules each of which have as a premise, test conditions which when satisfied will conclude on a component fault or will conclude on another test condition which then becomes the premise for one or more other rules, comprising the step of:
(1) selecting one of the machines for diagnosis,
(2) storing, in the fact base, machine data from a machine information database (MID) and associated sensor data for the selected machine from a sensory input database (SID),
(3) applying certain rule in the rule base to the stored MID and SID data to compile a list a hypothesized faults,
(4) based on the compiled list of hypothesized faults, and the stored MID and SID data, selecting a list of rules from the plurality of rules which are applicable to the current machine configuration,
(5) backward chaining through said applicable rules to confirm which if any of the hypothesized fault are the cause of the machine problem.

6. An automated method of diagnosing potential and existing faults on a plurality of machine each of which have a plurality of components, using an expert system having a knowledge engineering tool, a machine information database (MID) containing information on characteristics of various components of said plurality of machines, a sensory input database (SID) containing sensory data taken at predetermined locations on each of said plurality of machines, and a knowledge base containing a plurality of general rules that are applicable to all components of interest in the plurality of machines without reference to any specific machine, said knowledge base including a fact base, and a rule base containing a plurality of rules each of which have as a premise, test conditions which when satisfied will conclude on a component fault or will conclude on another test condition which then becomes the premise for one or more other rules, comprising the step of:
(1) selecting one of the machines for diagnosis,
(2) storing, in the fact base, the machine data from the MID and associated sensor data from the SID for the selected machine,
(3) applying certain rule in the rule base to the stored MID and SID data to compile a list a hypothesized faults,
(4) based on hypothesized faults, and the stored MID and SID data, selecting a list of rules from the plurality of rules which are applicable to the current machine configuration,
(5) backward chaining through said applicable rules to confirm which if any of the hypothesized fault are the cause of the machine problem.

7. An automated method of diagnosing potential and existing faults on any one of a plurality of machine each of which are comprised of a plurality of components, using an expert system having a knowledge engineering tool; and a knowledge base (KB) having a rule base containing a plurality of general rules that are applicable to all components of interest in the plurality of machines without reference to any specific machine, and a fact base, comprising the step of:
(1) retrieving data relating to the machine to be diagnosed, from a computer aided design database,
(2) continuously collecting sensory data from strategic locations on the machine,
(3) processing the sensory data to identify predetermined characteristics of the sensory data,
(4) applying the rules in the KB rule base to identify faults from the processed data of step (3).

8. An automated method of diagnosing potential and existing faults on any one of a plurality of machines each of which is comprised of a plurality of components, using an expert system having a knowledge engineering tool, and a knowledge base (KB) containing a rule base and a fact base, comprising the step of:
(1) retrieving data relating to the machine to be diagnosed, from a computer aided design database
(2) continuously collecting sensory data from strategic locations on the machine,
(3) processing the sensory data to identify predetermined characteristics of the sensory data,
(4) applying the rules in the KB rule base to identify faults from the processed data of step (3).

9. An automated method of diagnosing potential and existing faults on any one of a plurality of machines each of which is comprised of a plurality of components, using an expert system having a knowledge engineering tool, and a knowledge base (KB) containing a rule base and a fact base, comprising the step of:
(1) establishing a machine information database (MID) on the various machines to be diagnosed
(2) collecting sensory data from the specific machine that is to be diagnosed
(3) storing the sensory data in a sensory input database (SID),
(4) retrieving from the MID and storing in the KB fact-base the description of a specific machine to be diagnosed,
(5) retrieving from the SID and storing in the KB fact-base the sensory data for the specific machine to be diagnosed,
(6) processing the sensory data to identify predetermined characteristics of the sensory data,
(7) applying the rules in the KB to try to confirm faults from the processed data of step (6)

(8) presenting to the user, any confirmed faults and appropriate recommendations for their repair.

10. An automated method of diagnosing potential and existing faults on any one of a plurality of machines each of which is comprised of a plurality of components, using an expert system having a knowledge engineering tool, and a knowledge base (KB), the KB having a rule base containing a plurality of rules each of which have as a premise, test conditions which when satisfied will conclude on a component fault or will conclude on another test condition which then becomes the premise for one or more other rules, and a fact base which includes both static and dynamic portions, comprising the step of:

(1) establishing a machine information database (MID) on the various machines to be diagnosed
(2) collecting sensory data from the specific machine that is to be diagnosed
(3) converting the sensory data to a form acceptable by the knowledge engineering tool and storing the sensory data in a sensory input database (SID),
(4) retrieving from the MID and storing in the KB dynamic fact-base the description of a specific machine to be diagnosed,
(5) retrieving from the SID and storing in the KB dynamic fact-base the sensory data for the specific machine to be diagnosed,
(6) processing the sensory data to identify predetermined characteristics of the sensory data,
(7) applying the rules in the KB to try to confirm faults from the processed data of step (6)
(8) presenting to the user, any confirmed faults and appropriate recommendations for their repair.

11. An automated method of diagnosing potential and existing faults on any one or a plurality of machines each of which is comprised of a plurality of components, using an expert system having a knowledge engineering tool, and a knowledge base (KB), the KB having a rule base containing a plurality of rules each of which have as a premise, test conditions which when satisfied will conclude on a component fault or will conclude on another test condition which then becomes the premise for one or more other rules, and a fact base which includes both static and dynamic portions, comprising the step of:

(1) establishing a machine information database (MID) on the various machines to be diagnosed
(2) collecting sensory data from the specific machine that is to be diagnosed
(3) converting the sensory data to a form acceptable by the knowledge engineering tool and storing the sensory data in a sensory input database (SID),
(4) retrieving from the MID and storing in the KB dynamic fact-base the description of a specific machine to be diagnosed,
(5) retrieving from the SID and storing in the KB dynamic fact-base the sensory data for the specific machine to be diagnosed,
(6) processing the sensory data to identify and to qualitatively classify the values of the sensory data which exceed predetermined thresholds,
(7) applying the rules in the KB to try to confirm faults from the data that exceeds the threshold,
(8) presenting to the user, any confirmed faults and appropriate recommendations for their repair.

12. An automated method of diagnosing potential and existing faults on any one of a plurality of machines each of which is comprised of a plurality of components, using an expert system having a knowledge engineering tool, and a knowledge base (KB), the KB having a rule base containing a plurality of rules each of which have as a premise, test conditions which when satisfied will conclude on a component fault or will conclude on another test condition which then becomes the premise for one or more other rules, and a fact base which includes both static and dynamic portions, comprising the step of:

(1) establishing a machine information database (MID) on the various machines to be diagnosed
(2) collecting sensory data from the specific machine that is to be diagnosed
(3) converting the sensory data to a form acceptable by the knowledge engineering tool and storing the sensory data in a sensory input database (SID),
(4) retrieving from the MID and storing in the KB dynamic fact-base the description of a specific machine to be diagnosed,
(5) retrieving from the SID and storing in the KB dynamic fact-base the sensory data for the specific machine to be diagnosed,
(6) processing the sensory data to identify and to qualitatively classify the values of the sensory data which exceed predetermined thresholds,
(7) generating a hypothesized fault list based on the sensory data that exceeds the thresholds,
(8) applying the rules in the KB to try to confirm faults from the list,
(9) presenting to the user, any confirmed faults and appropriate recommendations for their repair.

13. An automated method of diagnosing potential and existing faults on any one of a plurality of machines each of which is comprised of a plurality of components, using an expert system having a knowledge engineering tool, and a knowledge base (KB), the KB having a rule base containing a plurality of rules each of which have as a premise, test conditions which when satisfied will conclude on a component fault or will conclude on another test condition which then becomes the premise for one or more other rules, and a fact base which includes both static and dynamic portions, comprising the step of:

() establishing a machine information database (MID) on the various machines to be diagnosed
(2) collecting sensory data from the specific machine that is to be diagnosed
(3) converting the sensory data to a form acceptable by the knowledge engineering tool and storing the sensory data in a sensory input database (SID),
(4) retrieving from the MID and storing in the KB dynamic fact-base the description of a specific machine to be diagnosed,
(5) retrieving from the SID and storing in the KB dynamic fact-base the sensory data for the specific machine to be diagnosed,
(6) processing the sensory data to identify predetermined characteristics of the sensory data,
(7) grouping the processed sensory data to isolate data representing potential faults of the machine on a priority basis,
(8) selecting one of the groups for analysis,
(9) generating a hypothesized fault list for the selected group,
(10) applying the rules in the KB to try to confirm faults from the list,

(11) presenting to the user, any confirmed faults and appropriate recommendations for their repair.

14. An automated method as defined in claim 13 wherein said sensory data is vibration data and the predetermined characteristics identified in step (6) are peaks and humps.

15. An automated method of diagnosing potential and existing faults on any one of a plurality of machines each of which is comprised of a plurality of components, using an expert system having a knowledge engineering tool, and a knowledge base (KB), the KB having a rule base containing a plurality of rules each of which have as a premise, test conditions which when satisfied will conclude on a component fault or will conclude on another test condition which then becomes the premise for one or more other rules, and a fact base which includes both static and dynamic portions, comprising the step of:
   (1) establishing a machine information database (MID) on the various machines to be diagnosed
   (2) collecting sensory data from the specific machine that is to be diagnosed
   (3) converting the sensory data to a form acceptable by the knowledge engineering tool and storing the sensory data in a sensory input database (SID),
   (4) retrieving from the MID and storing in the KB dynamic fact-base the description of a specific machine to be diagnosed,
   (5) retrieving from the SID and storing in the KB dynamic fact-base the sensory data for the specific machine to be diagnosed,
   (6) processing the sensory data to identify predetermined characteristics of the sensory data,
   (7) grouping the processed sensory data to isolate data representing potential faults of the machine on a priority basis,
   (8) selecting one of the groups for analysis,
   (9) generating a hypothesized fault list for the selected group,
   (10) applying the rules in the KB to a selected group of data in an attempt to reach conclusions regarding which of the potential faults can be confirmed,
   (11) if no fault is confirmed, then selecting tests which will further assist in confirming potential faults,
   (12) if tests have been selected, then ordering the tests in a prioritized sequence based on predetermined criteria,
   (13) performing at least one of the ordered tests and storing the collected data in the fact base,
   (14) repeating steps (10)–(13) until a fault can be confirmed or until no more test remain, and
   (15) presenting to the user, any confirmed faults and appropriate recommendations for their repair.

16. An automated method as defined in claim 15 wherein said sensory data is vibration data and the predetermined characteristics identified in step (6) are based on values of the data that significantly deviate from normal peaks and humps.

17. An automated method as defined in claim 15 wherein said sensory data is vibration data and the predetermined characteristics identified in step (6) are peaks and humps.

18. An automated method of diagnosing potential and existing faults on any one of a plurality of machines each of which is comprised of a plurality of components, using an expert system having a knowledge engineering tool, and a knowledge base (KB), the KB having a rule base containing a plurality of rules each of which have as a premise, test conditions which when satisfied will conclude on a component fault or will conclude on another test condition which then becomes the premise for one or more other rules, and a fact base which includes both static and dynamic portions, comprising the step of:
   (1) establishing a machine information database (MID) on the various machines to be diagnosed
   (2) collecting vibration data from the specific machine that is to be diagnosed
   (3) converting the vibration data to a form acceptable by the knowledge engineering tool and storing the vibration data in a sensory input database (SID),
   (4) retrieving from the MID and storing in the KB dynamic fact-base the description of a specific machine to be diagnosed,
   (5) retrieving from the SID and storing in the KB dynamic fact-base the vibration data for the specific machine to be diagnosed,
   (6) processing the vibration data to identify the peaks and humps in the vibration data,
   (7) grouping the peak and humps to isolate data representing potential faults of the machine on a priority basis,
   (8) selecting one or more of the groups for analysis,
   (9) generating a hypothesized fault list for the selected group,
   (10) applying the rules in the KB to a selected one of groups of data in an attempt to reach conclusions regarding which of the potential fault can be confirmed,
   (11) if no fault is confirmed, then selecting tests which will further assist in confirming potential faults,
   (12) if tests have been selected, then ordering the tests in a prioritized sequence based on (a) time required for test, (b) equipment needed, (c) ease of performing the test, and (d) number of potential faults which are identifiable by running the particular test,
   (13) performing at least one of the ordered tests and storing the collected data in the fact base,
   (14) repeating steps (10)–(13) until a fault can be confirmed or until no more test remain,
   (15) repeating step (10) if step (8) selected more than one group and repeating step (11)–(14) for the next selected group until no more groups remain to be analyzed,
   (16) presenting to the user, any confirmed faults and appropriate recommendations for their repair.

* * * * *